United States Patent [19]

Rasberger

[11] 4,247,694
[45] Jan. 27, 1981

[54] COMPLEXES OF METAL SALTS OF HYDROXYBENZOIC ACIDS AND PIPERIDINES

[75] Inventor: Michael Rasberger, Riehen, Switzerland

[73] Assignee: Ciba-Geigy Corporation, Ardsley, N.Y.

[21] Appl. No.: 949,828

[22] Filed: Oct. 10, 1978

Related U.S. Application Data

[63] Continuation of Ser. No. 876,980, Feb. 13, 1978, abandoned.

[30] Foreign Application Priority Data

Feb. 23, 1977 [CH] Switzerland ............................ 2219/77

[51] Int. Cl.³ .................. C07F 15/04; C07F 15/06; C07F 3/06
[52] U.S. Cl. ................. 546/11; 260/45.8 N; 260/45.75 N; 544/64; 544/129; 544/130; 546/187; 546/188; 546/189; 546/190; 546/191; 546/207; 546/208; 546/214; 546/221; 546/222; 546/223; 546/224; 546/226; 546/227; 546/238; 546/239
[58] Field of Search ................. 546/11, 187, 188, 189, 546/190, 191, 223, 224, 221, 222, 226, 227, 207, 208, 214, 238, 239; 544/64, 129, 130; 260/45.8 N, 45.75 N

[56] References Cited

U.S. PATENT DOCUMENTS

| | | | |
|---|---|---|---|
| 3,189,630 | 6/1965 | Smutny | 260/429.2 |
| 3,684,765 | 8/1972 | Matsui et al. | 260/45.8 N |
| 3,901,931 | 8/1975 | Rasberger et al. | 260/439 R |
| 3,904,581 | 9/1975 | Murayama | 260/45.8 N |
| 3,939,168 | 2/1976 | Cook | 260/45.8 N X |
| 3,948,852 | 4/1976 | Rasberger et al. | 260/45.75 N |
| 4,033,928 | 7/1977 | Randell et al. | 260/45.8 N |
| 4,186,267 | 1/1980 | Rasberger | 546/11 |

*Primary Examiner*—Henry R. Jiles
*Assistant Examiner*—Richard A. Schwartz
*Attorney, Agent, or Firm*—Harry Falber

[57] ABSTRACT

The invention relates to metal salts of hydroxybenzoic acids which are complexed with a 4-amino-polyalkylpiperidine derivative or to mixed metal salts of a hydroxybenzoic acid and a polyalkylpiperidine carboxylic acid which may be complexed or not with an 4-amino-polyalkylpiperidine. The metal cation may be that of a di- or trivalent metal such as Ni, Co, Al, Zn or Ca. From hydroxybenzoic acids the 3,5-di-tert.butylbenzoic acid is preferred.

These salts are valuable light stabilizers for plastics, especially for polyolefins, styrene polymers and polyamides or polyurethanes respectively. The salts show a strong tendency to retain water. For high compatibility with plastics a low water content is of importance.

7 Claims, No Drawings

COMPLEXES OF METAL SALTS OF HYDROXYBENZOIC ACIDS AND PIPERIDINES

This is a continuation of application Ser. No. 876,980, filed on Feb. 13, 1978, now abandoned.

The invention relates to new metal salts of hydroxybenzoic acids which are complexed with polyalkylpiperidine ligands. It also relates to the use of these compounds as stabilisers for polymers and to the polymers stabilised with these compounds.

It is known from U.S. Pat. No. 3,189,630 that metal salts of hydroxybenzoic acids can be used as stabilisers for polymers. Because of their sterically hindered phenol group, these compounds have an antioxidising action and, if the metal salts are paramagnetic, they also act as light stabilisers. Examples of such salts are the rare earth metal salts or the nickel salts and cobalt salts of 3,5-di-tert.-butyl-4-hydroxybenzoic acid.

If salts of this type are complexed with amine ligands, their stability to heat and also their compatibility with polyolefines are increased. Complex metal salts of this type are described, for example, in DT-OS Nos. 2,330,906 and 2,436,616. Mixed nickel salts which also contain another anion in addition to the hydroxybenzoate anion are also described in the latter patent specification.

It has now been found that the light-stabilising action of such complex salts of hydroxybenzoic acids can be further considerably increased when a derivative of a polyalkyl-4-aminopiperidine is used as the amine ligand or—in the case of mixed salts—the anion of a polyalkylpiperidine-4-carboxylic acid or polyalkylpiperidine-4-alkylenecarboxylic acid or polyalkylpiperidine-4-aminoalkylenecarboxylic acid is used as the second anion. Complex salts of this type are new compounds.

The present invention therefore relates to compounds of the formula I

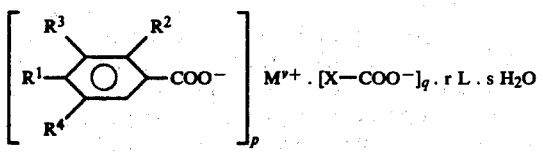

in which either $R^1$ is hydroxyl and $R^2$ is hydrogen or $R^1$ is hydrogen and $R^2$ is hydroxyl, $R^3$ and $R^4$ are hydrogen or $C_1$-$C_5$-alkyl, $M^{v+}$ represents the v-valent cation of a metal of the series comprising Ni, Co, Al, Zn, Sn, Ca, Mg and Cu or $R_2Sn$, in which R denotes $C_1$-$C_8$-alkyl or $C_3$-$C_{21}$-alkoxycarbonylalkyl, X represents $C_1$-$C_{20}$-alkyl, which can be substituted by OH or $NH_2$, $C_5$-$C_{12}$-cycloalkyl, phenyl, which can be substituted by $C_1$-$C_8$-alkyl, $C_7$-$C_{16}$-aralkyl, which can be substituted by OH, or a group of the formula II, III or IV,

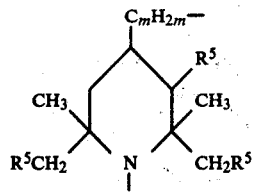

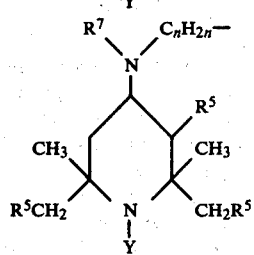

in which Y represents hydrogen, oxyl, $C_1$-$C_{12}$-alkyl, $C_3$-$C_6$-alkenyl, propargyl, benzyl, 2,3-epoxypropyl, $C_2$-$C_{12}$-alkanoyl, $C_3$-$C_4$-alkenoyl or a group of the formula $-CH_2-CH(OR^9)-R^8$, $-CH_2COOR^{10}$ or $-CH_2CH_2COOR^{10}$, in which $R^8$ denotes hydrogen, methyl or phenyl, $R^9$ denotes hydrogen, $C_1$-$C_{18}$-alkyl, $C_3$-$C_6$-alkenyl, $C_3$-$C_6$-alkinyl, $C_5$-$C_{12}$-cycloalkyl, $C_7$-$C_{14}$-aralkyl, $C_1$-$C_{18}$-alkanoyl, $C_3$-$C_4$-alkenoyl or benzoyl and $R^{10}$ denotes $C_1$-$C_{12}$-alkyl, allyl, cyclohexyl, phenyl or benzyl, m denotes a number from 1 to 5 and n denotes a number from 1 to 12, $R^5$ is hydrogen or $C_1$-$C_4$-alkyl, $R^6$ is one of the groups $-OH$, $-O-C(O)R^{11}$, $-NH_2$ or $-NHC(O)R^{11}$ and $R^{11}$ is a monovalent aliphatic, aromatic or araliphatic radical which has up to 18 C atoms and can be substituted in the aromatic part by OH, Cl, $C_1$-$C_4$-alkyl or $C_1$-$C_4$-alkoxy, and $R^7$ represents hydrogen, $C_1$-$C_{18}$-alkyl, $C_3$-$C_6$-alkenyl, $C_3$-$C_6$-alkinyl, $C_3$-$C_{20}$-alkoxyalkyl, $C_7$-$C_{14}$-aralkyl or hydroxyaralkyl, 2,3-epoxypropyl, cyanoethyl, $C_1$-$C_{12}$-alkanoyl, benzoyl or one of the groups $-CH_2-CH(OR^9)-R^8$, $-CH_2COOR^{10}$ or $-CH_2CH_2COOR^{10}$, which are as defined above, p is 1, 2 or 3, q is zero, 1 or 2 and v is 2 or 3, q being equal to v-p, r is zero or has a value of 1 to 2, s has a value of 0 to 2 and L is a ligand of the formula V

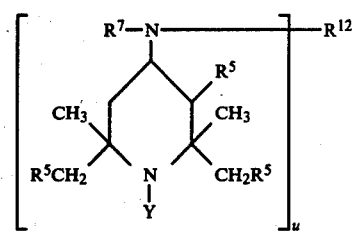

in which $R^5$, $R^7$ and Y have the meanings indicated above, u is 1 or 2 and, when u is 1, $R^{12}$ represents $C_1$-$C_{18}$-alkyl, which can be substituted by one or two of the groups $-OR^9$, $-COOR^{13}$ or $-N(R^{13})_2-$ in which $R^{13}$ is $C_1$-$C_4$-alkyl— or by a 5-membered or 6-membered heterocyclic radical which contains 1 or 2 N-atoms and/or O-atoms, or represents $C_3$-$C_{12}$-alkoxyalkyl, cyanoethyl, $C_3$-$C_6$-alkenyl, $C_3$-$C_4$-alkinyl, $C_5$-$C_{12}$-cycloalkyl, $C_6$-$C_{14}$-aryl, which can be substituted by halogen, hydroxyl, $C_1$-$C_4$-alkoxy, $C_1$-$C_6$-alkyl or $C_2$-$C_5$-alkoxycarbonyl, $C_7$-$C_{14}$-aralkyl, which can be substi-

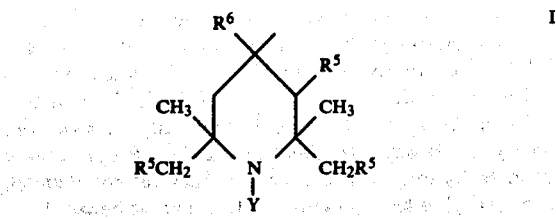

tuted in the aryl radical by $C_1$-$C_4$-alkyl and/or hydroxyl, or a group of the formula VI

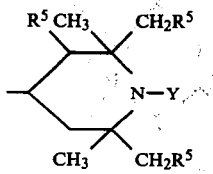

or, if u is 2, $R^{12}$ represents $C_2$-$C_{12}$-alkylene, which can be substituted by 1 or 2 of the groups —OH or —COOR$^{13}$, or NR$_{14}$ interrupted $C_2$-$C_{12}$-alkylene wherein $R_{14}$ represents hydrogen, $C_1$-$C_{18}$-alkyl, cyclohexyl, allyl or benzyl, $C_3$-$C_6$ alkenylene, $C_6$-$C_{10}$-arylene, $C_5$-$C_8$-cycloalkylene, xylylene or a group of the formula -A-Z-A-, in which A denotes a $C_6$-$C_{10}$-arylene radical or $C_5$-$C_8$-cycloalkylene radical and Z denotes oxygen, —CH$_2$— or —SO$_2$—, it being possible for r to be zero only when X represents a group of the formula II, III or IV.

If $R^1$ is hydroxyl, the compounds of the formula I are complex metal salts of p-hydroxybenzoic acid or of alkylated p-hydroxybenzoic acids. If $R^2$ is hydroxyl, the compounds are complex nickel salts of salicyclic acid or of alkylated salicylic acids. Preferably, $R^1$ is hydroxyl and $R^2$ is hydrogen.

If $R^3$ and $R^4$ are alkyl groups with 1–5 C atoms, these are, for example, a methyl, ethyl, n-propyl, iso-propyl, n-butyl or 1,1-dimethylpropyl group, but preferably a tertiary butyl group.

The cation $M^{v+}$ can be $Ni^{2+}$, $Co^{2+}$, $Al^{3+}$, $Zn^{2+}$, $Sn^{2+}$, $Ca^{2+}$, $Mg^{2+}$ or $Cu^{2+}$; preferred cations are $Ni^{2+}$, $Co^{2+}$, $Zn^{2+}$ and $Al^{3+}$ and $Ni^{2+}$ and $Zn^{2+}$ are particularly preferred.

The cation $M^{v+}$ can also be a divalent diorgano-tin cation $R_2Sn^{2+}$, for example the divalent dimethyl-tin, dibutyl-tin, diisobutyl-tin, dihexyl-tin, dioctyl-tin, di-(dodecylcarbonylmethyl)-tin, di-($\beta$-ethoxycarbonylethyl)-tin or di-($\beta$-octadecyloxycarbonylethyl)-tin cation, If q is zero, p=v, that is to say all the valencies of the cation $M^{v+}$ are saturated by hydroxybenzoate anions. In this case r must be at least 1. If q is 1 or 2 and X is not a piperidine radical, r must again be at least 1. However if q is 1 or 2 and X is a piperidine radical of the formula II, III or IV, r can also be zero. Thus, overall, there must be at least one polyalkylpiperidine radical in the molecule of the compounds of the formula I.

If X is not a piperidine radical, the anion X-COO$^-$ is the anion of a known monocarboxylic acid, such as, for example, of acetic acid, propionic acid, butyric acid, isovaleric acid, trimethylacetic acid, caproic acid, caprylic acid, 2-ethylcaproic acid, lauric acid, stearic acid, glycollic acid or lactic acid or of glycine or alanine or of $\epsilon$-aminocaproic acid, $\omega$-aminolauric acid, cyclohexanecarboxylic acid, cyclooctanecarboxylic acid, benzoic acid, p-toluic acid, p-tert.-butylbenzoic acid, phenylacetic acid or phenylpropionic acid.

If X is a piperdine derivative of the formula II, $R^6$ can be OH and the anion X-COO$^-$ is then the anion of a 4-hydroxypiperidine-4-carboxylic acid. These acids can be prepared from the corresponding 4-oxopiperidines by cyanohydrin synthesis, as is described, for example, in Ann. 459 (1927), 217–233.

If $R^6$ is NH$_2$, X-COO$^-$ is the anion of a 4-aminopiperidine-4-carboxylic acid. Acids of this type can be prepared by hydrolysing 4-spirohydantoinpiperidines, as is described, for example, in Bull. Soc. Chim. France 1967, 815. The corresponding acyloxy- or acylamino-carboxylic acids in which $R^6$ is —O—C(O)R$^{11}$ or —NHC(O)R$^{11}$ can be obtained by treating the acids with the carboxylic acid chlorides R$^{11}$COCl or the anhydrides (R$^{11}$CO)$_2$O. R$^{11}$CO in this case denotes the residue of a known monocarboxylic acid, for example of acetic acid, propionic acid, butyric acid, trimethylacetic acid, caproic acid, 2-ethylcaproic acid, caprylic acid, lauric acid, stearic acid, benzoic acid, chlorobenzoic acid, salicylic acid, 3,5-ditert.-butyl-4-hydroxybenzoic acid, toluic acid, 4-butylbenzoic acid, 4-methoxybenzoic acid, phenylacetic acid, 4-chlorophenylacetic acid, 4-butoxyphenylacetic acid or 4-tert.-butylphenylacetic acid.

If m is 1, the corresponding piperidine-4-acetic acids can be prepared by the process described in DT-OS No. 2,337,796. If m is 2–5, $C_mH_{2m}$ can be a branched or straight-chain alkylene group and the corresponding acids X-COOH can be manufactured either in the same way as the compounds in which m=1 or by reacting the corresponding 4-oxopiperidines with phosphonoalkylcarboxylic acid esters and subsequently hydrogenating and hydrolysing the resulting piperidinylene compounds. The compounds in which m is 1 or 2 are preferred.

If X is a piperidine derivative of the formula IV, X-COO$^-$ represents the anion of a N-(4-piperidinyl)-aminoalkylcarboxylic acid. The radical $C_nH_{2n}$ can be a straight-chain or branched alkylene group with 1-12 C atoms and preferably with 1–8 C atoms. Such acids, or their esters, are described in DT-OS No. 2,349,962 and can be prepared, for example, by reacting the corresponding NH compounds with acrylates or with chloroacetates and subsequently hydrolysing the reaction product. They can also be prepared by reductive amination of the corresponding 4-oxopiperidines in the presence of the aminocarboxylic acids H$_2$N—C$_n$H$_{2n}$—COOH, or their esters. $R^7$ can be alkyl, for example methyl, ethyl, isopropyl, butyl, octyl, hexyl, dodecyl or octadecyl; it can be alkenyl, such as, for example, allyl or methallyl; it can be alkinyl, such as, for example, propargyl or but-2-in-1-yl; it can be alkoxyalkyl, such as, for example, methoxyethyl, butoxyethyl, ethoxypropyl, octyloxyethyl or dodecyloxybutyl; it can be aralkyl or hydroxyaralkyl, such as, for example, benzyl, methylbenzyl, phenylethyl, phenylpropyl, 3-hydroxybenzyl or 4-hydroxyphenylethyl; it can be alkanoyl, such as, for example, acetyl, propionyl, isobutyryl, capronyl, caprylyl or lauroyl; it can be benzoyl; it can be a group —CH$_2$CH(OR$^9$)—R$^8$, in which $R^8$ denotes hydrogen, methyl or phenyl and $R^9$ can be hydrogen, alkyl, alkenyl or alkinyl (with the same meanings as defined for $R^7$) or can be cycloalkyl, such as, for example, cyclopentyl, cyclohexyl or cyclooctyl, or can be aralkyl, such as, for example, benzyl, phenylethyl, naphthylmethyl or phenylpropyl, or can be alkanoyl with 1–18 C atoms, alkenoyl, such as, for example, acryloyl, methacryloyl or crotonoyl, or benzoyl, or $R^7$ denotes a group —CH$_2$—COOR$^{10}$ or —CH$_2$CH$_2$—COOR$^{10}$, in which $R^{10}$ denotes alkyl with 1–12 C atoms, allyl, cyclohexyl, phenyl or benzyl. In the formula IV, $R^7$ preferably denotes hydrogen, alkyl with 1–12 C atoms, benzyl, cyanoethyl, alkanoyl with 1–4 C atoms or benzoyl.

In the formulae II, III and IV, $R^5$ can be alkyl with 1-5 C atoms, for example methyl, ethyl, butyl or pentyl, but $R^5$ preferably represents hydrogen.

In the formulae II, III and IV, Y can represent an alkyl radical, such as, for example, methyl, ethyl, propyl, butyl, hexyl, octyl, nonyl or dodecyl; it can represent alkenyl, such as, for example, allyl or methallyl; it can be alkanoyl or alkenoyl, such as, for example, acetyl, propionyl, butyryl, capronyl, lauroyl, acryloyl or crotonoyl, or it can represent one of the groups —CH$_2$—CH(OR$^9$)—R$^8$, —CH$_2$COOR$^{10}$ or —CH$_2$CH$_2$COOR$^{10}$, in which the meaning of the substituents $R^8$, $R^9$ and $R^{10}$ can be as for $R^7$. Y is preferably hydrogen, oxyl, alkyl with 1-4 C atoms, allyl or benzyl.

The ligand L represents a derivative of 4-aminopiperidine and is defined by the formula V. In this formula, $R^5$ and Y have meanings the same as those which they can have in the formulae II, III and IV. In formula V, $R^5$ is preferably hydrogen and Y is hydrogen, oxyl, alkyl with 1-4 C atoms, allyl or benzyl. $R^7$, in formula V, has the same meaning as it can have in formula IV and $R^7$, in formula V, is preferably hydrogen, alkyl with 1-4 C atoms, cyanoethyl, hydroxyethyl, benzyl or —CH$_2$COOR$^{13}$, in which $R^{13}$ denotes alkyl with 1-4 C atoms.

If u is 1, $R^{12}$ can be an alkyl radical which has 1-18 C atoms and can be substituted by 1 or 2 of the groups —OR$^9$, —COOR$^{13}$ or —N(R$^{13}$)$_2$ or by a heterocyclic radical. Examples of $R^{12}$ are methyl, ethyl, isopropyl, butyl, hexyl, octyl, decyl, dodecyl, tetradecyl, octadecyl, hydroxyethyl, hydroxypropyl, 5-hydroxypentyl, acetoxyethyl, butyryloxyethyl, stearoyloxypropyl, crotonoyloxybutyl, acryloxyethyl, benzoyloxypropyl, methoxycarbonylethyl, ethoxycarbonylethyl, 2-methoxycarbonylpropyl, dimethylaminoethyl, 3-diethylaminopropyl, 2-(1-morpholino)-ethyl, 2-(1-piperidino)-ethyl, 2-(1-pyrrolidino)-ethyl, tetrahydrofurfuryl-2-methyl, 3-(1-morpholino)-propyl or 3-(1-pyrrolidino)-propanol.

$R^{12}$ can be alkoxyalkyl, such as, for example, 2-methoxyethyl, 2-butoxyethyl or 2-octyloxypropyl; it can be alkenyl, such as allyl or methallyl; it can be cycloalkyl, such as cyclopentyl, cyclohexyl, cyclooctyl or cyclododecyl; it can be alkinyl, such as propargyl or butinyl; it can be aryl or substituted aryl, such as, for example, phenyl, naphthyl, tolyl, 4-butylphenyl, 3-chlorophenyl, 4-hydroxyphenyl, 4-ethoxyphenyl, 4-chloro-1-naphthyl, 4-methoxycarbonylphenyl or 2-ethoxycarbonylphenyl; alternatively it can be aralkyl or substituted aralkyl, such as, for example, benzyl, phenylethyl, phenylpropyl, 4-hydroxybenzyl, 3,5-di-tert.-butyl-4-hydroxyphenylethyl or naphthylmethyl. Preferably, $R^{12}$ is alkyl with 1-18 C atoms, allyl, propargyl, cyanoethyl, hydroxyalkyl with 2-6 C atoms, cycloalkyl with 5-8 C atoms, alkoxycarbonylalkyl with 3-6 C atoms, aralkyl with 7-9 C atoms, which can be substituted by $C_1$-$C_4$-alkyl and/or OH, or a group of the formula IV. Compounds in which $R^{12}$ is alkyl with 1-12 C atoms, allyl, propargyl, cyanoethyl, cyclohexyl, hydroxyalkyl with 2-4 C atoms, benzyl or a group of the formula VI are particularly preferred.

If u is 2, $R^{12}$ can be alkylene which has 2-12 C atoms and can be substituted by 1 or 2 of the groups —OH or —COOR$^{13}$, such as, for example, methylene, ethylene, trimethylene, tetramethylene, hexamethylene, octamethylene, decamethylene, dodecamethylene, 2-hydroxy-trimethylene or 4,4-di-ethoxycarbonylheptamethylene.

As a divalent radical, $R^{12}$ can also be alkenylene, such as, for example, butenylene or hexenylene; it can be arylene, such as, for example, m- or p-phenylene, 1,4-naphthylene or 4,4'-diphenylene; it can be cycloalkylene, such as, for example, cyclohexylene, or cyclooctylene, and it can be a group -A-Z-A- which has the meaning defined above, such as, for example, the divalent radicals of diphenylmethane, di-cyclohexyl-methane, diphenyl oxide, diphenyl sulphone or di-cyclohexyl sulphone.

Amongst the divalent radicals for $R^{12}$, alkylene with 2-6 C atoms is preferred.

The aminopiperidines of the formula V can be prepared by subjecting the corresponding 4-oxopiperidines of the formula VII

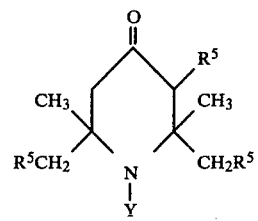

VII either (a) to a catalytic hydrogenation in the presence of equivalent amounts of a monoamine or diamine of the formula $R^{12}(NH_2)_u$ and optionally subsequently introducing the radical $R^7$ or (b) to a catalytic hydrogenation in the presence of one mol of a monoamine of the formula $R^7NH_2$ and subsequently introducing the radical $R^{12}$. Which of the methods (a) or (b) is to be preferred depends on the particular meaning of the substituents $R^7$ and $R^{12}$. Thus, for example, when $R^7$ is an acyl radical only route (a) can be chosen. Finally it is possible for (c) the hydrogenation of the oxopiperidine of the formula VII to be effected in the presence of an amine of the formula $R^7$—NH—$R^{12}$, in which case both substituents are introduced in a single reaction step. A further method for the preparation of the aminopiperidines of the formula V is the introduction of the radicals $R^{12}$ and $R^7$ into a 4-aminopiperidine of the formula VIII

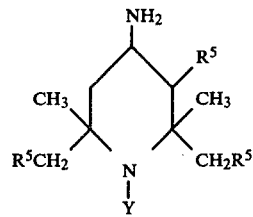

VIII

Methods suitable for this purpose are the methods known for the N-substitution of primary and secondary amines, such as alkylation, alkenylation, alkinylation, cyanoalkylation, hydroxyalkylation, carbalkoxyalkylation or benzylation.

Examples of compounds of the formula V and their manufacture by various methods are described in DT-OS Nos. 2,040,975, 2,349,962 and 2,621,870.

The parameter r can have a value between 1 and 2 if some of the coordination centers are covered by water molecules. The water contained in the compounds of the formula I can either be bound to the central atom by coordinate bonds or can be in the form of water of crystallisation. The parameter s can therefore have any desired values between 0 and 2. Complexes which have a low water content are preferred.
Examples of compounds of the formula I are the compounds of the following formulae. In these formulae X denotes a tert.butyl radical.
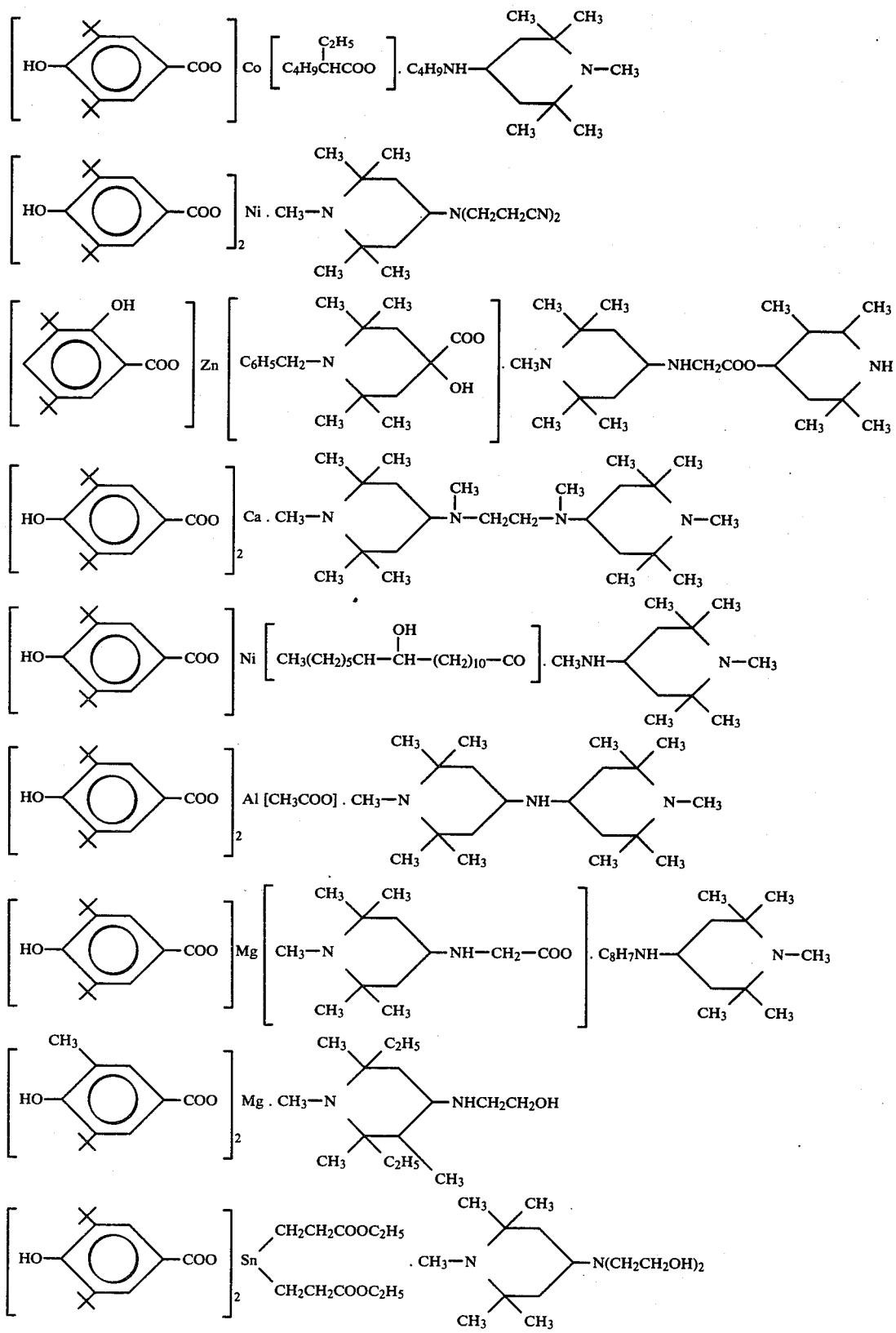

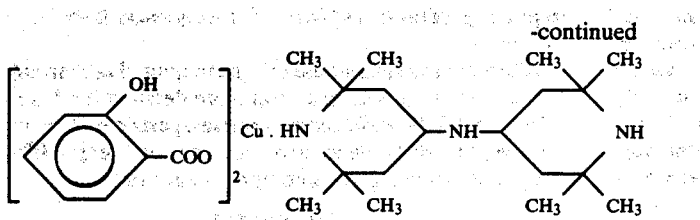

In these formulae it is not taken into account that the compounds can contain up to 1 mol of water.

The compounds of the formula I can be manufactured according to known methods. The ligand-free metal salts of the formula I, in which r=0, can be manufactured by reacting inorganic metal salts, such as, for example, the metal chlorides, metal nitrates or metal carbonates, or simple organic salts, such as the metal oxalates or metal acetates, with p mols of a corresponding hydroxybenzoic acid, or an alkali metal salt thereof, and q mols of the acid X-COOH, or an alkali metal salt thereof. The reaction is appropriately carried out in a solvent in which the metal salt which is formed is readily soluble but in which the alkali metal salt which is formed during the reaction is insoluble, so that the latter can readily be removed by filtration. Examples of such solvents are alcohols, such as methanol, ethanol or ispropanol, or ethers, such as diethyl ether, tetrahydrofurane or dioxane.

In order to manufacture the corresponding diorganotin compounds, preferably the dichlorides $R_2SnCl_2$ are reacted with 2 mols of an alkali metal salt of the hydroxybenzoic acid or of the acid X-COOH.

The complexing of the ligand-free metal salts is preferably effected by adding 1 or 2 mols of the ligand L to a solution of the ligand-free salt in a temperature range of 15°–150° C. and preferably of 60°–135° C. Solvents which can be used for this purpose are virtually all the organic solvents in which the particular ligands are soluble. Those solvents in which an azeotropic dehydration of the products can be effected by distilling off part of the solvent, such as, for example, toluene or xylene, are particularly suitable.

The two reactions can be combined by first reacting a metal salt with alkali metal carboxylates, filtering off the alkali metal salt formed and reacting the resulting solution, without isolation of the ligand-free metal carboxylate, with the ligand L.

The complexed metal salts are isolated by evaporating the solution and optionally recrystallising the products.

As individual compounds or as mixtures, the compounds of the formula I are excellent stabilisers for polymers and, above all, their protective action against light-induced degradation is outstanding. In addition, they also possess a protective action against thermo-oxidative damage. They also increase the ease with which the polymers can be coloured.

The present invention therefore also relates to a process for stabilising polymers by the addition of compounds of the formula I. Examples of polymers which can be stabilised according to the invention are the following classes:

1. Polymers of monoolefines and diolefines, for example polyethylene (which optionally can be crosslinked), polypropylene, polyisobutylene, polymethylbutene-1, polymethylpentene-1, polyisoprene or polybutadiene.

2. Mixtures of the polymers mentioned under (1), for example mixtures of polypropylene with polyethylene or with polyisobutylene.

3. Copolymers of monoolefines and diolefines, such as, for example, ethylene/propylene copolymers, propylene/butene-1 copolymers, propylene/isobutylene copolymers, ethylene/butene-1 copolymers and also terpolymers of ethylene with propylene and a diene, such as hexadiene, dicyclopentadiene or ethylidenenorbornene.

4. Polystyrene.

5. Copolymers of styrene of α-methylstyrene with dienes or acrylic derivatives, such as, for example, styrene/butadiene, styrene/acrylonitrile, styrene/acrylonitrile/methyl acrylate; mixtures, of high impact strength, of styrene copolymers and another polymer, such as, for example, a polyacrylate, a diene polymer or an ethylene/propylene/diene terpolymer; and block copolymers of styrene, such as, for example, styrene/butadiene/styrene, styrene/isoprene/styrene or styrene/ethylene/butylene/styrene.

6. Graft copolymers of styrene, such as, for example, styrene on polybutadiene, styrene and acrylonitrile on polybutadiene and mixtures thereof with the copolymers mentioned under (5), such as are known as so-called ABS polymers.

7. Halogen-containing polymers, such as, for example, polyvinyl chloride, polyvinylidene chloride, polyvinyl fluoride, polychloroprene, chlorinated rubbers and copolymers, such as vinyl chloride/vinylidene chloride, vinyl chloride/vinyl acetate or vinylidene chloride/vinyl acetate.

8. Polymers which are derived from α,β-unsaturated acids and derivatives thereof, such as polyacrylates and polymethacrylates, polyacrylamides and polyacrylonitrile.

9. Polymers which are derived from unsaturated alcohols and amines or acrylic derivatives or acetals thereof, such as polyvinyl alcohol, polyvinyl acetate, polyvinyl stearate, polyvinyl benzoate, polyvinyl maleate, polyvinylbutyral, polyallyl phthalate, polyallylmelamine and copolymers thereof with other vinyl compounds, such as ethylene/vinyl acetate copolymers.

10. Homopolymers and copolymers of epoxides, such as polyethylene oxide, polypropylene oxide or copolymers thereof with bisglycidyl ethers.

11. Polyacetals, such as polyoxymethylene and those polyoxymethylenes which contain ethylene oxide as a comonomer.

12. Polyphenylene oxides.

13. Polyurethanes and polyureas.

14. Polycarbonates.

15. Polysulphones.

16. Polyamides and copolyamides which are derived from diamines and dicarboxylic acids and/or from aminocarboxylic acids or the corresponding lactams, such as polyamide 6, polyamide 6/6, polyamide 6/10, polyamide 11 or polyamide 12.

17. Polyesters which are derived from dicarboxylic acids and dialcohols and/or from hydroxycarboxylic acids or the corresponding lactones, such as polyethylene terephthalate, polybutylene terephthalate and poly-1,4-dimethylol-cyclohexane terephthalate, and also block polyether esters which are derived from polyethers with hydroxyl terminal groups and dicarboxylic acids.

18. Crosslinked polymers which are derived from aldehydes on the one hand and phenols, ureas and melamines on the other hand, such as phenol/formaldehyde resins, urea/formaldehyde resins and melamine/formaldehyde resins.

19. Alkyd resins, such as glycerol/phthalic acid resins and mixtures thereof with melamine/formaldehyde resins.

20. Unsaturated polyester resins which are derived from copolyesters of saturated and unsaturated dicarboxylic acids with polyhydric alcohols and vinyl compounds as crosslinking agents, and also the halogen-containing, difficultly combustible modifications thereof.

21. Crosslinked epoxide resins which are derived from polyepoxides, for example from bis-glycidyl ethers or from cycloaliphatic diepoxides.

22. Natural polymers, such as cellulose, rubber, proteins and derivatives thereof which are chemically modified in a polymer-homologous manner, such as cellulose acetates, cellulose propionates and cellulose butyrates, or cellulose ethers, such as methylcellulose.

Among these polymers, the groups 1–6, 13, 16 and 17 are to be emphasised because in these substrates the stabilisers according to the invention have a particularly marked effect.

The stabilisers are added to the polymers in a concentration of 0.05 to 1.5% by weight, calculated relative to the material to be stabilised. Preferably, 0.1 to 0.8% by weight of the compounds, calculated relative to the material to be stabilised, are added.

The addition can be made after polymerisation, for example by mixing the compounds, and optionally further additives, into the melt by the methods customary in the art, before or during shaping, or also by applying the dissolved or dispersed compounds to the polymer, with subsequent evaporation of the solvent if necessary.

The compounds of the formula I can also be added to the plastics to be stabilised in the form of a master batch which contains these compounds, for example in a concentration of 2.5 to 25% by weight.

In addition to the compounds of the formula I, yet further known stabilisers and co-stabilisers can also be added to the polymers. These stabilisers can be, for example, antioxidants, light stabilisers or metal deactivators, or also co-stabilisers, such as, for example, those of the phosphorous acid ester type. Furthermore, other additives customary in plastics technology, such as, for example, flameproofing agents, antistatic agents, plasticisers, lubricants, blowing agents, pigments, reinforcing materials or fillers, can also be added. Examples of individual additives which can be used together with the compounds of the formula I are given on pages 18–24 of DT-OS No. 2,427,853.

The invention therefore also relates to polymers which are stabilised by the addition of 0.05 to 1.5% by weight of a compound of the formula I and which optionally can also contain other known and customary additives. The polymers stabilised in this way can be used in very diverse forms, for example as films, fibres, tapes or profiles or as binders for lacquers, adhesives or putties.

The preparation and use of the compounds according to the invention is described in more detail in the examples which follow. In these examples, parts denote parts by weight and % denotes percentages by weight. The temperatures are given in degrees centigrade.

EXAMPLE 1

18.4 g (0.033 mol) of nickel bis-(3,5-di-tert.butyl-4-hydroxy-benzoate) with a water content of 3.5% are dissolved in 250 ml of dry toluene. 11.8 g (0.033 mol) of N,N'-dimethyl-N,N'-di-(1,2,2,6,6-pentamethyl-4-piperidinyl)-ethylenediamine are added to this solution and the solution is heated under reflux for 15 hours, water being separated off as an azeotrope. After distilling off the solvent in vacuo, the green residue is dried for 20 hours at 60° and 14 mbars. Analysis shows a content of 5.74% of Ni and 0.8% of $H_2O$. This corresponds to a complex with molar proportions of $r=1$ and $s=0.42$.

EXAMPLES 2 TO 16

The procedure followed is as described in Example 1 and in each case one mol of nickel bis-(3,5-di-tert.butyl-4-hydroxybenzoate) containing 4.1% of $H_2O$ is reacted with one mol of the amines indicated in Table I.

TABLE I

| Example No. | Amine employed | Analysis Ni % | Analysis $H_2O$ % | Molar ratio r | Molar ratio s |
|---|---|---|---|---|---|
| 2 | N-(1,2,2,6,6-tetramethyl-4-piperidinyl)-N-methyl-butylamine | 6.35 | 0.7 | 1 | 0.3 |
| 3 | N-(2,2,6,6-tetramethyl-4-piperidinyl)-methylamine | 7.64 | 0.23 | 1 | 0.1 |
| 4 | N-(1,2,2,6,6-pentamethyl-4-piperidinyl)-dimethylamine | 7.77 | 0.5 | 1 | 0.2 |
| 5 | N-[1-(2-hydroxyethyl)-2,2,6,6-tetramethyl-4-piperidinyl]-di-ethanolamine | 6.37 | 0.85 | 1 | 0.4 |
| 6 | N-(2,2,6,6-tetramethyl-4-piperidinyl)-2-ethylhexylamine | 6.11 | 1.3 | 1 | 0.6 |
| 7 | N,N'-bis-(2,2,6,6-tetramethyl-4-piperidinyl)-ethylenediamine | 5.85 | 0.5 | 1 | 0.25 |
| 8 | N,N-bis-(1,2,2,6,6-pentamethyl-4-piperidinyl)-methylamine | 5.73 | 2.0 | 1 | 1 |
| 9 | bis-(2,2,6,6-tetramethyl-4-piperidinyl)-amine | 6.15 | 2.3 | 1 | 0.85 |
| 10 | N-(2,2,6,6-tetramethyl-4-piperidinyl)-butylamine | 7.24 | 1.25 | 1 | 0.5 |
| 11 | N-(2,2,6,6-tetramethyl-4-piperidinyl)-o-hydroxybenzyl-amine | 6.86 | 1.6 | 1 | 0.7 |
| 12 | N-(1,2,2,6,6-pentamethyl-4-piperidinyl)-dodecylamine | 6.29 | 1.9 | 1 | 0.95 |
| 13 | N,N'-dimethyl-N,N'-bis-(1,2,2,6,6-pentamethyl-4-piperidinyl)-tetramethylene-diamine | 5.93 | 0.9 | 1 | 0.5 |
| 14 | N,N'-dimethyl-N,N'-bis-(1,2,2,6,6-pentamethyl-4-piperidinyl)-trimethylene-diamine | 5.84 | 1.5 | 1 | 0.8 |
| 15 | N,N'-dimethyl-N,N'-bis-(1,2,2,6,6-pentamethyl-4-piperidinyl)-hexamethylene-diamine | 5.87 | 2.70 | 1 | 1.5 |
| 16 | N,N''-bis-(2,2,6,6-tetramethyl-4-piperidinyl)-diethylene triamine | 5.74 | 0.8 | 1 | 0.42 |

EXAMPLES 17 AND 18

The procedure followed is as described in Example 1 except that, instead of the nickel salt, there is used cobalt-bis-(3,5-di-tert.-butyl-4-hydroxybenzoate) with a water content of 18.5%, and this is reacted with 1 molar equivalent of 1,2,2,6,6-pentamethyl-4-dimethylaminopiperidine to obtain the 1:1-complex as a blue solid having a content of 8.20% of Co and 0.4% of $H_2O$.

With an analogous reaction of the above cobalt salt with 1 molar equivalent of N,N'-dimethyl-N,N'-di-(1,2,2,6,6-pentamethyl-4-piperidinyl)-ethylenediamine, there is obtained the blue 1:1-complex having a content of 6.41% of Co and 0.6% of $H_2O$.

EXAMPLES 19 AND 20

The procedure followed is as described in Example 1 except that, instead of the nickel salt, there is used zinc-bis-(3,5-di-tert.-butyl-4-hydroxybenzoate). The colourless 1:1-complex having a content of 6.26% of Co and 0.5% of $H_2O$ ($r=1$, $s=0.27$) is obtained.

The zinc complex of the following formula is obtained in an analogous manner:

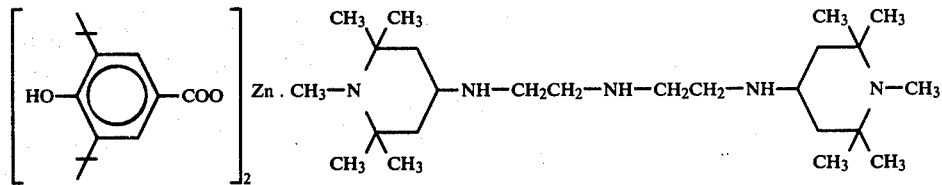

Analysis shows a content of 5.95% of Zn and 0.5% of $H_2O$.

EXAMPLE 21

A sodium ethylate solution prepared from 4.6 g of sodium and 70 ml of ethanol is added dropwise, with stirring, to a solution of 25 g (0.1 mol) of 3,5-di-tert.-butyl-4-hydroxybenzoic acid and 11.6 g (0.1 mol) of caproic acid in 150 ml of ethanol, and stirring is subsequently maintained for 1 hour at 50°. After cooling to room temperature, the reaction solution is slowly added dropwise, with stirring, to a solution of 23.7 g (0.1 mol) of $NiCl_2.6H_2O$ in 100 ml of ethanol, and refluxing is then performed for 1 hour. After cooling, the NaCl which has formed is filtered off, and the filtrate is concentrated in vacuo. The residue is dissolved in 200 ml of toluene, and 36.5 g (0.1 mol) of N,N'-dimethyl-N,N'-di-(1,2,2,6,6-pentamethyl-4-piperidinyl)-ethylene diamine are added to the solution.

The solution is then refluxed for 15 hours with azeotropic separation of the water. The solution thus dehydrated is concentrated in vacuo, and the green residue is dried for 20 hours at 60°/14 Torr. The analysis shows a content of 6.96% of Ni and 1.1% of $H_2O$, which corresponds to a complex with molar proportions of $r=1$ and $s=0.48$.

EXAMPLES 22–25

In a manner analogous to that described in Example 21, there are produced the mixed nickel salts and the amine complexes thereof, which are listed in Table II, of the general formula

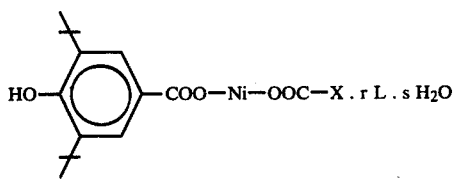

TABLE II

| Example No. | X | L | r | S | Analysis % Ni | % $H_2O$ |
|---|---|---|---|---|---|---|
| 22 | n-$C_5H_{11}$ | NH—$CH_2CH_2$—NH with two 2,2,6,6-tetramethylpiperidinyl groups (NH) | 1 | 0,25 | 7,46 | 0,6 |
| 23 | 2,2,6,6-tetramethyl-4-piperidinyl-HN—NH—$CH_2$— | $CH_3$—N—$CH_2CH_2$—N—$CH_3$ with two 1,2,2,6,6-pentamethyl-4-piperidinyl groups | 1 | 0,6 | 6,29 | 1,2 |
| 24 | " | — | 0 | 0,53 | 10,3 | 1,8 |

TABLE II-continued

| Example No. | X | L | r | s | Analysis % Ni | % H$_2$O |
|---|---|---|---|---|---|---|
| 25 | " | NH—(piperidine(CH$_3$)$_4$NH)—CH$_2$CH$_2$—NH—(piperidine(CH$_3$)$_4$NH) | 1 | 0,48 | 6,46 | 1,0 |

EXAMPLE 26-32

Using a procedure analogous to that of Example 21, there are produced the amine complexes, listed in Table III, of the

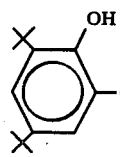

$$\text{(X,X-substituted-2-hydroxybenzoate)—COO—Ni—OOC—X . r L . s H}_2\text{O}$$

TABLE III

| Example No. | X | L | r | s | Analysis % Ni | % H$_2$O |
|---|---|---|---|---|---|---|
| 26 | 3,5-di-X-2-hydroxyphenyl | NH—(piperidine(CH$_3$)$_4$)—(CH$_2$)$_6$—NH—(piperidine(CH$_3$)$_4$) | 1 | 1,8 | 6,55 | 3,3 |
| 27 | 2,2,6,6-tetramethylpiperidin-4-yl-NH-CH$_2$— | " | 1 | 6,62 | 6,51 | 1,3 |
| 28 | " | 2,2,6,6-tetramethylpiperidin-4-yl-NH—C$_4$H$_9$ | 1 | 0,32 | 8,59 | 0,8 |
| 29 | 3,5-di-X-2-hydroxyphenyl | " | 1 | 0,47 | 8,60 | 1,1 |
| 30 | " | 1,2,2,6,6-pentamethylpiperidin-4-yl-N(CH$_3$)—C$_4$H$_9$ | 1 | 0,62 | 8,22 | 1,4 |
| 31 | 3,5-di-X-2-hydroxyphenyl | NH—(piperidine(CH$_3$)$_4$NH)—CH$_2$—CH$_2$—NH—(piperidine(CH$_3$)$_4$NH) | 1 | 0,35 | 6,80 | 6,7 |

TABLE III-continued

| Example No. | X | L | r | s | Analysis % Ni | % H₂O |
|---|---|---|---|---|---|---|
| 32 | " | 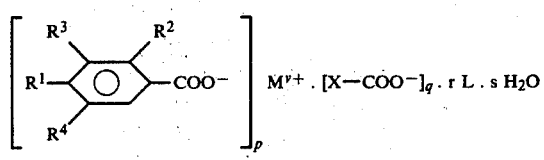 | 1 | 0.69 | 6.66 | 1.8 |

EXAMPLE 33

1000 parts of polypropylene powder (melt index 1.5/10 minutes (230° C., 2160 g)) are mixed in a drum mixer with 1 part of pentaerythritol-tetrakis-[β-(3,5-ditert.-butyl-4-hydroxyphenyl)propionate] and 1.5 parts of a light stabiliser from the following Table, and subsequently granulated in an extruder at a temperature of 180°-220° C. The granules obtained are processed in a second extruder with a slit die (temperature 220°-260° C.) into the form of a sheet; this is cut into tapes which are then stretched at elevated temperature to six times their original length, and subsequently wound on a bobbin (titre of the tapes: 700-900 den.; tensile strength: 5.5-6.5 g/den.). These polypropylene tapes are mounted without tension on glass plates and irradiated in a Xenotest apparatus 1200. Five test specimens are taken each time after various intervals, and their tensile strength is determined. The criterion for the protective action of the individual light stabilisers is taken as being the exposure time after which the tensile strength of the tapes has fallen to 50% of the initial value. The values obtained are given in Table IV.

TABLE IV

| Light stabiliser | | Hours of exposure until tensile strength has fallen to 50% |
|---|---|---|
| none | | 240 |
| compound from Example No. | 1 | 2 900 |
| " | 5 | 1 740 |

What is claimed is:

1. A compound of the formula I $$\left[ \begin{array}{c} R^3 \quad R^2 \\ R^1 - \bigcirc - COO^- \\ R^4 \end{array} \right]_p \quad M^{v+} \cdot [X - COO^-]_q \cdot r\, L \cdot s\, H_2O \quad I$$

in which
either $R^1$ is hydroxyl and $R^2$ is hydrogen or $R^1$ is hydrogen and $R^2$ is hydroxyl, $R^3$ and $R^4$ are hydrogen or $C_1$-$C_5$-alkyl, $M^{v+}$ represents the v-valent cation of a metal selected from the group of Ni, Co, Al, Zn, Sn, Ca, Mg or Cu or a divalent radical $R_2$ Sn, in which R denotes $C_1$-$C_8$-alkyl or $C_3$-$C_{21}$-alkoxycarbonylalkyl X represents $C_1$-$C_{20}$-alkyl or OH- or NH₂-substituted $C_1$-$C_{20}$-alkyl, $C_5$-$C_{12}$-cycloalkyl or phenyl, or $C_1$-$C_8$-alkyl-substituted $C_5$-$C_{12}$-cycloalkyl or phenyl, $C_7$-$C_{16}$-aralkyl, $C_7$-$C_{16}$-aralkyl substituted by OH— or a group of the formula II, III or IV, $$\begin{array}{c} R^6 \\ \diagdown \\ CH_3 \diagdown \diagup R^5 \\ \diagup \diagdown CH_3 \\ R^5CH_2 - N - CH_2R^5 \\ | \\ Y \end{array} \quad II$$

$$C_mH_{2m}-$$

$$\begin{array}{c} R^5 \\ CH_3 \diagdown \diagup \\ \diagup \diagdown CH_3 \\ R^5CH_2 - N - CH_2R^5 \\ | \\ Y \end{array} \quad III$$

$$R^7 \diagdown N \diagup C_nH_{2n}-$$

$$\begin{array}{c} R^5 \\ CH_3 \diagdown \diagup \\ \diagup \diagdown CH_3 \\ R^5CH_2 - N - CH_2R^5 \\ | \\ Y \end{array} \quad IV$$

Y represents hydrogen, oxyl, $C_1$-$C_{12}$-alkyl, $C_3$-$C_6$-alkenyl, propargyl, benzyl, 2,3-epoxypropyl, $C_2$-$C_{12}$-alkanoyl, $C_3$-$C_4$-alkenoyl or a group of the formulae —CH₂—CH(OR⁹)—R⁸, —CH₂COOR¹⁰ or CH₂CH₂COOR¹⁰, in which $R^8$ denotes hydrogen, methyl or phenyl, $R^9$ denotes hydrogen, $C_1$-$C_{18}$-alkyl, $C_3$-$C_6$-alkinyl, $C_5$-$C_{12}$-cycloalkyl, $C_7$-$C_{14}$-aralkyl, $C_1$-$C_{18}$-alkanoyl, $C_3$-$C_4$-alkenoyl or benzoyl and $R^{10}$ denotes $C_1$-$C_{12}$-alkyl, allyl, cyclohexyl, phenyl or benzyl, m denotes a number from 1 to 5, n denotes a number from 1 to 12, $R^5$ is hydrogen or $C_1$-$C_4$-alkyl, $R^6$ is OH, OC(O)R¹¹, NH₂ or NHC(O)R¹¹, wherein $R^{11}$ is a monovalent aliphatic, aromatic or araliphatic radical having up to 18 C atoms or a monovalent OH—, Cl—, $C_1$-$C_4$alkyl-or $C_1$-$C_4$-alkoxy-substituted aromatic or araliphatic radical having up to 18 C atoms, and $R^7$ represents hydrogen, $C_1$-$C_{18}$-alkyl, $C_3$-$C_6$-alkenyl, $C_3$-$C_6$-alkinyl, $C_3$-$C_{20}$-alkoxyalkyl, $C_7$-$C_{14}$-aralkyl or -hydroxy-aralkyl, 2,3-epoxypropyl, cyanoethyl, $C_1$-$C_{12}$-alkanoyl, benzoyl or one of the groups —CH₂—CH(OR⁹)—R⁸—CH₂—COOR¹⁰ or —CH₂CH₂COOR¹⁰, p is 1, 2 or 3,
v is 2 or 3
q is zero, 1 or 2, q is being equal to v-p, r is zero or r is a value of 1 to 2,
s has a value of 0 to 2 and
L is a ligand of the formula V

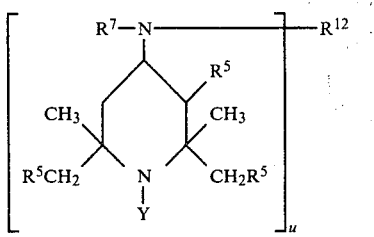

in which
R$^5$, R$^7$ and Y have the meanings indicated above, u is 1 or 2 and,
when u is 1, R$^{12}$ represents C$_1$–C$_{18}$-alkyl, C$_1$–C$_{18}$ alkyl substituted by one or two of the groups OR$^9$, COOR$^{13}$ or N(R$^{13}$)$_2$, in which R$^{13}$ is C$_1$–C$_4$-alkyl, C$_1$–C$_{18}$-alkyl substituted by morpholino, piperidino, pyrrolidino or tetrahydrofurfuryl, C$_3$–C$_{12}$-alkoxyalkyl, cyanoethyl, C$_3$–C$_6$-alkenyl, C$_3$–C$_4$-alkinyl, C$_5$–C$_{12}$-cycloalkyl, C$_6$–C$_{14}$-aryl, halogen-, hydroxyl- or C$_1$–C$_4$-alkoxy, C$_1$–C$_6$-alkyl- or C$_2$–C$_5$-alkoxy-carbonyl substituted C$_6$–C$_{12}$-aryl, C$_7$–C$_{16}$-aralkyl, C$_7$–C$_{16}$-aralkyl substituted in the aryl moiety by C$_1$–C$_4$-alkyl- and/or hydroxy, or a group of the formula VI

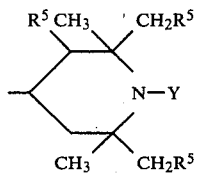

when u is 2, R$^{12}$ represents C$_2$–C$_{12}$-alkylene, C$_2$–C$_{12}$ alkylene substituted by 1 or 2 OH— or —COOR$^{13}$ groups, —NR$_{14}$— interrupted C$_2$–C$_{12}$-alkylene wherein R$_{14}$ represents hydrogen, C$_1$–C$_{18}$-alkyl, cyclohexyl, allyl or benzyl, C$_3$–C$_6$-alkenylene, C$_6$–C$_{10}$-arylene, C$_5$–C$_8$-cycloalkylene, xylylene or a group of the formula -A-Z-A, in which A denotes C$_6$–C$_{10}$-arylene or C$_5$–C$_8$-cycloalkylene and Z denotes oxygen, CH$_2$ or SO$_2$, with the proviso that r is zero only when X represents a group of the formulae II, III or IV.

2. A compound according to claim 1 of the formula I, in which R$^1$ is hydroxyl and R$^2$ is hydrogen and R$^3$ and R$^4$ are tertiary butyl.

3. A compound according to claim 1, in which M$^{v+}$ is a cation of Ni, Co, Al or Zn.

4. A compound according to claim 1 of the formula I, in which r has a value of 1 to 2 and L is a ligand of the formula V, in which R$^5$ denotes hydrogen, R$^7$ denotes hydrogen, C$_1$–C$_{12}$-alkyl, allyl, propargyl, cyanoethyl, C$_2$–C$_6$-alkoxyalkyl, C$_7$–C$_{14}$-aralkyl or hydroxyaralkyl, hydroxyethyl, hydroxypropyl, C$_1$–C$_4$-alkanoyl, benzoyl or one of the groups —CH$_2$COOR$^{10}$ or —CH$_2$—CH$_2$—COOR$^{10}$ and R$^{10}$ denotes C$_1$–C$_4$-alkyl, Y denotes hydrogen, oxyl, C$_1$–C$_4$-alkyl, allyl or benzyl and, if u is 1, R$^{12}$ represents C$_1$–C$_{18}$-alkyl, C$_2$–C$_6$-hydroxyalkyl, C$_3$–C$_6$-alkoxycarbonylalkyl, cyanoethyl, allyl, propargyl, C$_5$–C$_8$-cyaloalkyl, C$_7$–C$_9$-aralkyl, which can be substituted by C$_1$–C$_4$-alkyl and/or OH, or a group of the formula VI, or, if u is 2, R$^{12}$ represents C$_2$–C$_8$-alkylene, which can be substituted by a group —COOR$^{13}$ (R$^{13}$ denotes C$_1$–C$_4$-alkyl) or interrupted by —NH—, or phenylene, tolylene, diphenylene or a group of the formula -A-Z-A, in which A denotes phenylene or cyclohexylene and Z denotes oxygen or CH$_2$, X represents C$_1$–C$_{17}$-alkyl, which can be substituted by OH or NH$_2$, C$_5$–C$_8$-cycloalkyl, phenyl, C$_1$–C$_4$-substituted phenyl or C$_7$–C$_{10}$-aralkyl.

5. A compound according to claim 1 of the formula I, in which r is zero and q is 1 or 2, X represents a radical of the formula II, III or IV, in which R$^5$ is hydrogen, R$^7$ represents hydrogen, C$_1$–C$_{12}$-alkyl, allyl, benzyl, cyanoethyl, C$_1$–C$_4$-alkanoyl or benzyl, Y denotes hydrogen, C$_1$–C$_4$-alkyl, allyl or benzyl and R$^6$ denotes hydroxyl, m is 1 or 2 and n is 1 to 8.

6. A compound according to claim 1 of the formula I, in which R$^1$ is hydroxyl and R$^2$ is hydrogen, R$^3$ and R$^4$ are tertiary butyl, M$^{v+}$ represents the cation Ni$^{2+}$ or Zn$^{2+}$, p is 2 and q is zero, r is 1 and s has a value of 0 to 1 and L is a ligand of the formula V, in which R$^5$ is hydrogen, R$^7$ represents hydrogen, C$_1$–C$_4$-alkyl, allyl, benzyl, cyanoethyl, hydroxyethyl or the group —CH$_2$COOR$^{10}$ and R$^{10}$ represents C$_1$–C$_4$-alkyl, Y is hydrogen, oxyl, C$_1$–C$_4$-alkyl, allyl or benzyl and R$^{12}$ is C$_1$–C$_{12}$-alkyl, allyl, propargyl, cyanoethyl, cyclohexyl, C$_2$–C$_4$-hydroxyalkyl, benzyl, a radical of the formula VI or (if u=2) C$_2$–C$_6$-alkylene, which can be interrupted by NH.

7. A compound according to claim 1 of the formula I, in which R$^1$ is hydroxyl and R$^2$ is hydrogen, or R$^1$ is hydrogen and R$^2$ is hydroxyl, R$^3$ and R$^4$ are tertiary butyl, M$^{v+}$ represents the cation Ni$^{2+}$, Co$^{2+}$ or Zn$^{2+}$, X represents C$_1$–C$_{11}$-alkyl, or a group of the formula IV wherein n is 1 or 2, L is ligand of the formula V wherein, if u is 1, R$^{12}$ represents C$_1$–C$_{12}$-alkyl, hydroxyethyl or a group of the formula VI, and, if u is 2, R$^{12}$ represents C$_2$–C$_6$-alkylene, or C$_4$–C$_6$-alkylene interrupted by NH, and in the formulae IV, V and VI Y and R$^7$ represent hydrogen or methyl, and R$^5$ represents hydrogen.

* * * * *

UNITED STATES PATENT AND TRADEMARK OFFICE
CERTIFICATE OF CORRECTION

PATENT NO. : 4,247,694
DATED : JANUARY 27, 1981
INVENTOR(S) : MICHAEL RASBERGER

It is certified that error appears in the above—identified patent and that said Letters Patent are hereby corrected as shown below:

Claim 5, Column 20, line 27 reads:

"cyanoethyl, $C_1$-$C_4$-alkanoyl or benzyl, Y denotes hy-"

should read:

-- cyanoethyl, $C_1$-$C_4$-alkanoyl or benzoyl, Y denotes hy- --

Signed and Sealed this

Second Day of February 1982

[SEAL]

Attest:

Attesting Officer

GERALD J. MOSSINGHOFF
Commissioner of Patents and Trademarks